United States Patent [19]

Shiurila

[11] 3,982,442

[45] Sept. 28, 1976

[54] PRECISION SHAFT REGULATOR MECHANISM

[75] Inventor: John Shiurila, Pleasanton, Calif.

[73] Assignee: The Singer Company, New York, N.Y.

[22] Filed: Dec. 20, 1974

[21] Appl. No.: 534,940

[52] U.S. Cl. .............................. 74/10 R; 74/89.15; 116/115.5; 116/124 R

[51] Int. Cl.$^2$ .............................. F16H 35/18

[58] Field of Search ............... 74/10.1, 10 R, 10.21, 74/89.15, 527, 567; 116/115, 115.5, 124 R, 124 A

[56] References Cited

UNITED STATES PATENTS

| | | | |
|---|---|---|---|
| 2,782,751 | 2/1957 | Yanikoski | 116/124 R |
| 3,219,353 | 8/1966 | Koppelman | 116/115.5 |
| 3,241,515 | 3/1966 | Franklin | 74/10 R |
| 3,580,216 | 5/1971 | Weber | 116/115.5 |

*Primary Examiner*—Samuel Scott
*Assistant Examiner*—Randall Heald
*Attorney, Agent, or Firm*—Edward L. Bell; Robert E. Smith; Julian Falk

[57] ABSTRACT

A mechanism for the precisional turning of a threaded shaft or leadscrew wherein the turning of a hand knob is used to precisionally regulate the amount of turning of the shaft. By the hand turning of a drive knob, a pair of ring drive keys are made to move along the upper surface of a cam unit having two lobes and two recesses. A castellated counter ring, which is placed around the cam unit has equally spaced cogs which normally will not be engaged by the ring drive keys. However, when the ring drive keys fall into the recesses of the cam surface, they engage against two cogs on the counter ring causing them to shift a fixed amount, after which the rise of the lobe of the cam raises the ring drive keys out of engagement with the cogs of the counter ring. The effect of this is to turn the shaft, for example, 1/10 of a shaft revolution. The counter ring has inner index teeth which go into and out of engagement with notches placed in the cylindrical sides of the cam until said index notches (being equally spaced around the periphery of the cam surface) in, for example, ten equal intervals. Index numbers placed opposite the counter ring cogs can be referenced to an index mark to indicate the number of intervals that the shaft has been turned from its zero position. In one utilization of the shaft positioner, a wedge carriage threaded onto the turning shaft can be arranged to raise or lower the position of a wedge for auxiliary control purposes.

10 Claims, 7 Drawing Figures

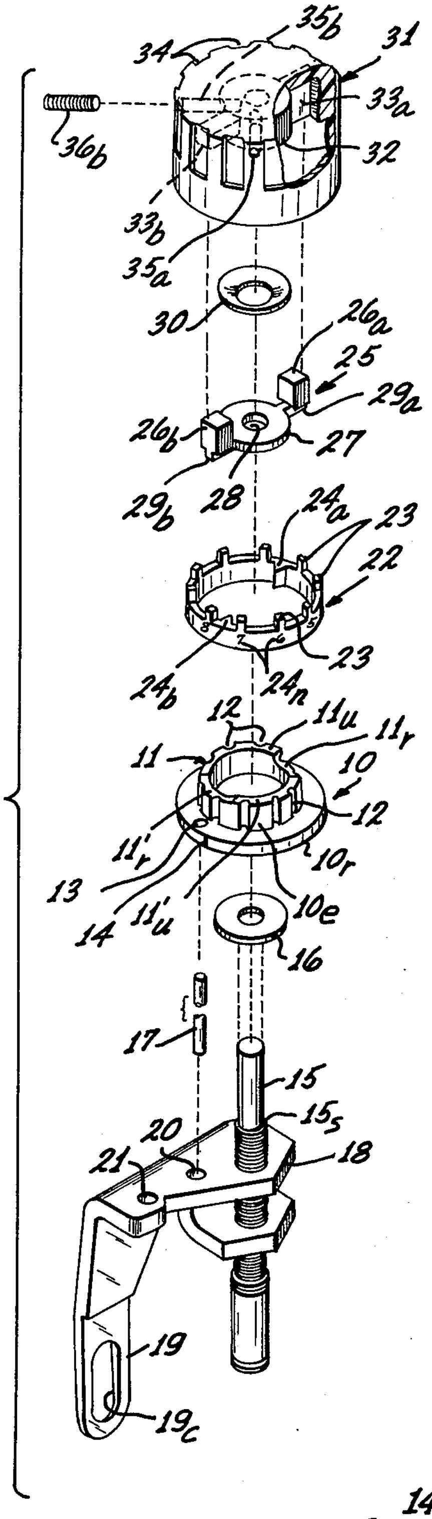
FIG. 1
FIG. 2
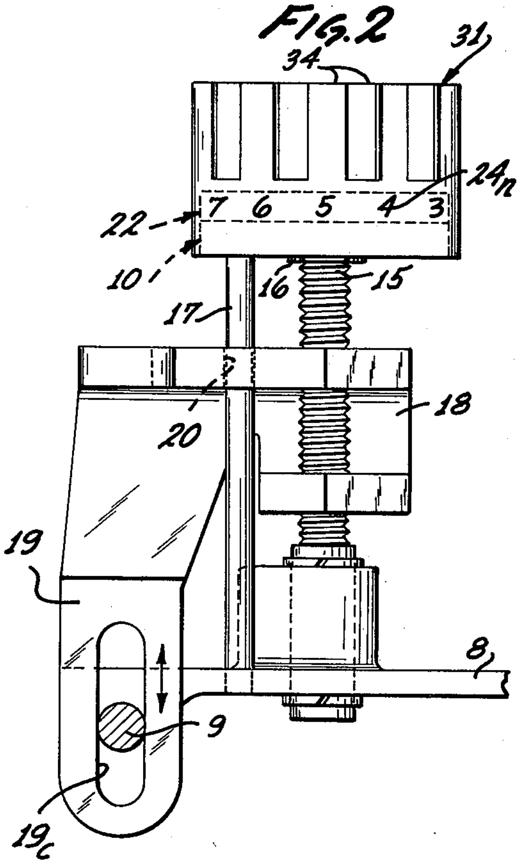
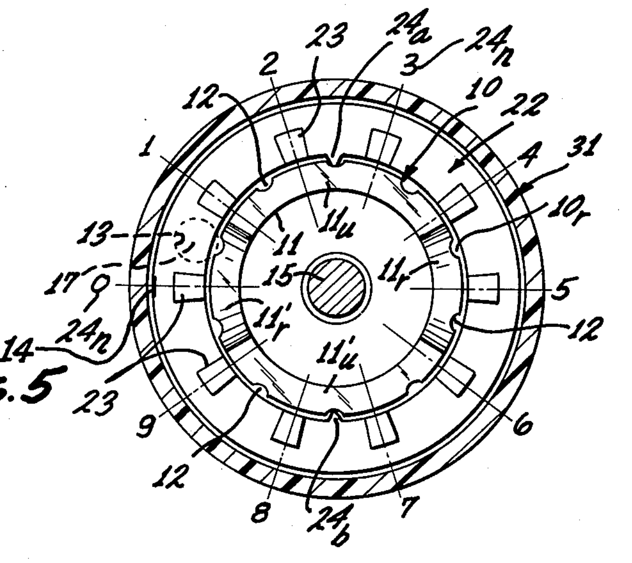
FIG. 5

PRECISION SHAFT REGULATOR MECHANISM

BACKGROUND OF THE INVENTION

It has been known in the prior art that various ways are possible for turning a threaded shaft or a leadscrew in a manner calculated to regulate and control the amount of rotation of the shaft or leadscrew. Many of these methods require complicated and expensive mechanical means which vary with the amount of the precision desired in the adjustment or turning of the shaft or leadscrew.

SUMMARY OF THE INVENTION

The present invention provides a simple inexpensive mechanism substantially made of plastic parts, which permits the precision regulation and control of the turning of a shaft or a leadscrew. A threaded shaft has a smooth portion which is fitted and fixed into a knob which can be turned by hand. This hand-turning knob has recesses which engage two lugs of a key-counter drive, the underside of which has two ring drive keys.

Mounted below the ring drive keys is a cam unit around which rides a counter ring having equally spaced cogs. The cam unit comprises a disc base having a raised cylindrical extension portion on top of which is an upper cam surface. The upper cam surface has two raised lobes and two recesses which form a track over which the ring drive keys can ride. The peripheral surface of the cylindrical extension of the cam has a series of ten equally spaced index notches which can engage and disengage with two inner index teeth provided on the inside periphery of the counter ring.

As the ring drive keys ride on the surface of the upper cam surface, they fall into recesses at 180° intervals and have the effect of the ring drive keys engaging against the adjacent cogs of the counter ring causing the counter ring to be rotated such that the inner index teeth will shift out of one notch and onto the next adjacent notch.

In the present embodiment, having ten index notches (and ten equal-spaced intervals between them), the effect of shifting the inner index teeth from one notch to the next notch, is to measure and control the rotation of the shaft as being 1/10 of a revolution.

The counter ring has a series of numerical indicia "0" through "9" associated with each of the upper cogs. A reference index-line mark is scribed on the base disc of the cam unit in order to indicate the number of intervals by which the counter ring and the shaft has turned in reference to the "zero" position.

Thus, by hand turning of the key-drive knob and the observation of the index mark in reference to the number opposite the counter ring cogs, it is possible to precisionally regulate and determine the amount of turning of the shaft or leadscrew and thus gain control and knowledge of the effect of the shaft rotation on an output device such as, for example, a carriage assembly mounted on the shaft or leadscrew.

BRIEF DESCRIPTION OF THE DRAWINGS

FIG. 1 is an exploded view showing all of the component parts of the shaft regulator mechanism.

FIG. 2 is a side view of the shaft control assembly showing the shaft support mechanism and carriage assembly to be controlled.

FIG. 5 is a top view of the cam unit and the counter ring encircling it, along section 5—5 of FIG. 3.

DESCRIPTION OF THE PREFERRED EMBODIMENT

Figure 3:
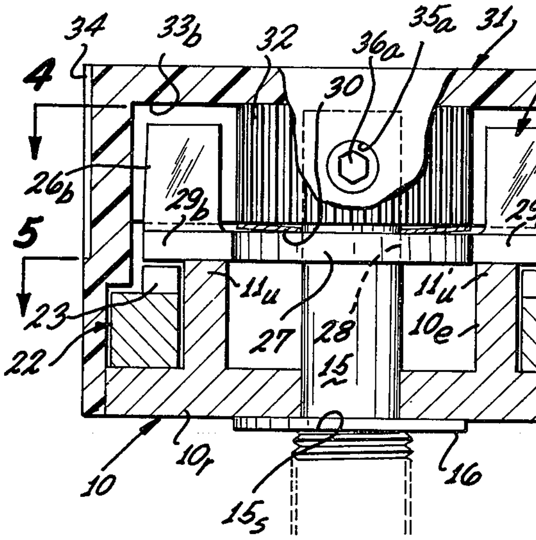
FIG. 3 is a side view in cross section of the shaft control assembly.

The shaft regulator assembly of FIG. 1 is seen composed of a shaft 15, a shoulder washer 16, a cam unit 10, a counter ring 22, a key-counter drive 25, a spring washer 30 and a key-drive knob 31.

Referring to FIG. 1, there is seen an exploded view of the various elements of the shaft regulating mechanism wherein a shaft 15, having smooth portions and threaded portions is seen capable of being mounted into a knurled hub insert 32 which is fitted in the top of knob 31. Set screw $36_a$ FIG. 3 and $36_b$ are made to enter set screw channels $35_a$ and $35_b$ penetrating the periphery of hub insert 32 in order to fasten the top end of shaft 15 to the key-drive knob 31.

Between the threaded portion and the smooth portion of shaft 15 is a shank extension $15_s$ which supports a shoulder washer 16. In turn, shoulder washer 16 supports and forms a base for the cam unit 10.

The cam unit 10 has a disc base portion $10_r$ and a cylindrical extension portion $10_e$. At equal intervals on the periphery of the cylindrical cam extension portion is a series of longitudinal index notches 12 which are placed at equal intervals around the periphery of the cam extension $10_e$. The upper cam surface 11 of the cylindrical cam extension is composed of hills and valleys which may be designated as rising lobes $11_u$ and $11'_u$ and recesses $11_r$ and $11'_r$.

The lower base disc portion $10_r$ of the cam unit 10 has an aperture 13 and an index mark 14 on the periphery of the base disc.

Figure 6:
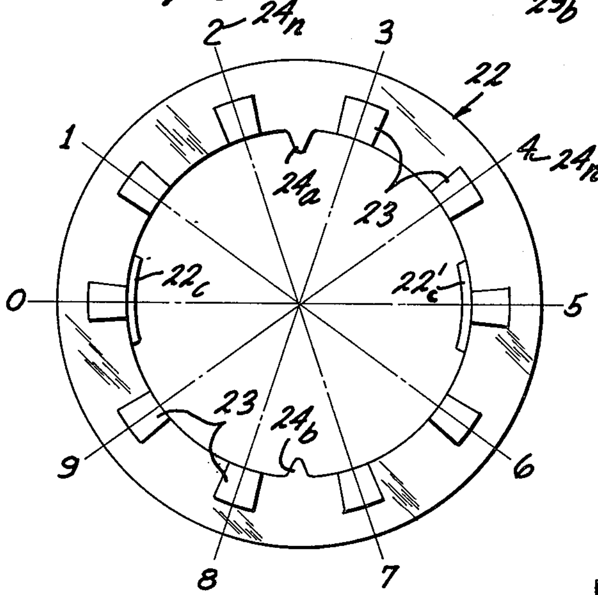
FIG. 6 is a top or plan view of the counter ring.

The counter ring 22, which is seen in FIG. 1 and also in FIGS. 5 and 6 constitutes a ring of plastic material which is made to rest on the cam base disc $10_r$ and to be able to rotate around the cam cylindrical extension portion $10_e$. As seen in FIGS. 1, 5 and 6, the counter ring 22 constitutes an annular ring having an upper castellated area composed of cogs 23. On the inner periphery of the counter ring 22 will be found two inner index teeth $24_a$ and $24_b$ which are placed 180° apart from one another. On the outside face of the counter ring 22 are inscribed a series of numerical indicia $24_n$ for purposes of indentification of individual cogs 23 in relationship to the index mark 14 of the cam unit 10.

The key-counter drive 25, seen in FIG. 1 and in FIG. 3 comprises a central disc 27 with an inner aperture 28. Extending from the central disc 27 are two ring-drive keys $29_a$ and $29_b$. Above the extending drive keys are two drive lugs $26_a$ and $26_b$.

The key-drive knob 31 is a hand-manipulable cap, made of transparent plastic which has embedded, in its topmost portion, a knurled hub insert 32. The outer periphery of the knob 31 is made of a serrated surface 34 for ease of gripping. Approximately one-third of the upper portion of the knob is solid plastic having two recesses $33_a$ and $33_b$ into which may rest the key-drive lugs $26_a$ and $26_b$ of the key-counter drive 25. Two open channels $35_a$ and $35_b$ are provided approximately 90° from one another for purposes of the insertion of set screws $36_a$ FIG. 3 and $36_b$ in order to fasten the smooth end of shaft 15 within the knurled hub insert 32 and thus also fasten the drive knob 31.

A spring washer 30 rests between the hub insert 32 of the drive knob 31 and the base disc 27 of the key-counter drive 25 in order to apply downward pressure to hold the ring drive keys $29_a$ and $29_b$ onto the top of upper cam surface 11.

The threaded portion of the shaft 15 can be used, for example, to support a wedge carriage 18 which can move and position a wedge 19 in order to provide control effects depending on the raising or lowering of the position of the wedge 19. A stop pin 17 mounts through aperture 13 of the cam unit 10 and through the aperture 20 of the wedge carriage 18 to anchor the cam unit and the wedge carriage in a stable relationship. The wedge carriage 18 may also provide an aperture 21 through which may be placed a limit screw (not shown) by which the overall limits of motion of the wedge carriage can be regulated.

In FIG. 2 is seen a view in elevation of the regulating mechanism of FIG. 1. The shaft 15 is made having a smooth portion with two retaining ring grooves toward the bottom which are fitted into a shaft support 8 to anchor the lower portion of the shaft 15. The shaft support 8 also mounts a guide pin 9 which is used for purposes of aligning the up-and-down motion of the wedge through the cut-out $19_c$. The wedge 19 is supported by the wedge carriage 18 which rides up-and-down on the threaded portion of the shaft 15. The stop pin 17 is shown connecting cam unit 10 and the wedge carriage 18 via insertion of the stop pin 17 through aperture 20. Counter ring 22 is shown visible through the transparent plastic of knob 31 to expose the numerals $24_n$. The serrations 34 on knob 31 provide greater facility for hand gripping of the knob 31.

Referring to FIG. 3, a side view is shown of a central section of the components of FIG. 1 assembled in operative connection.

The shaft 15 has its smooth end inserted into the knurled hub insert 32 where it is fastened by set screw $36_b$ through channel $35_b$.

The hub insert 32 is embedded in the plastic structure of the drive knob 31. The drive knob 31 has recesses $33_a$ and $33_b$ into which may fit the lugs $26_a$ and $26_b$ which connect to the drive keys $29_a$ and $29_b$ which are extensions from the key-counter central disc 27.

The keys $29_a$ and $29_b$ are seen riding on the upper cam surface 11 which means that the drive keys $29_a$ and $29_b$, at the moment, are on the high lobe portions $11_u$ and $11'_u$ of the cam surface so as not to be in engagement with the cogs 23 of the counter ring 22.

The cam unit 10 is seen having its base disc $10_r$ and its cylindrical annular extension $10_e$. The shoulder washer 16 provides a stop and support for the cam unit 10 by its support of the cam base disc $10_r$.

Figure 4:
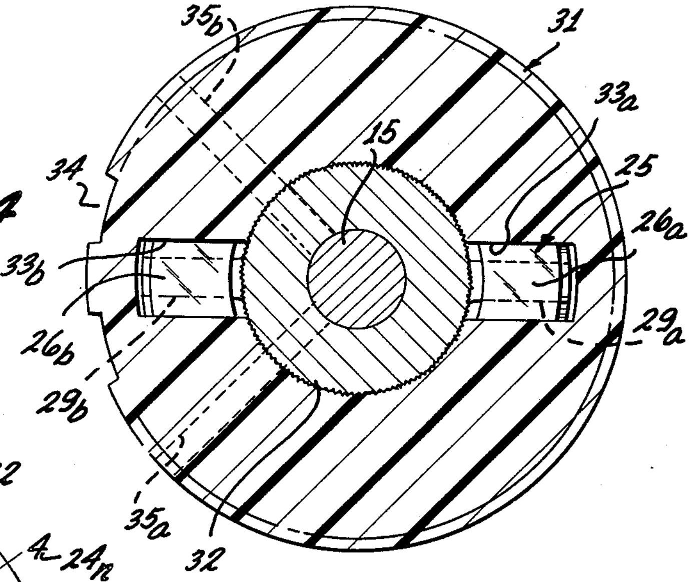
FIG. 4 is a top view of the key-drive knob, along section 4-4 of FIG. 3.

FIG. 4 shows a top view section of FIG. 3 along the section 4—4. Referring to FIG. 4 there is seen the drive knob 31 with external serrations 34, said knob having internal recesses $33_a$ and $33_b$ and a knurled hub insert 32 which has a central aperture into which can fit the shaft 15. Channels $35_a$ and $35_b$ provide openings through which set screws may be inserted in order to anchor shaft 15 to the hub insert 32 and also the drive knob 31.

FIG. 5 is a top view of the section 5—5 of FIG. 3.

Shaft 15 is shown protruding through the aperture of the cam unit base disc $10_r$. The upper cam surface 11 is shown having the two recesses $11_r$ and $11'_r$ and the two rising lobes $11_u$ and $11'_u$. The index notches 12 of the cam unit 10 provide the detents for the inner index teeth $24_a$ and $24_b$ of the counter ring 22. The cogs 23 are seen on the upper areas of the counter ring 22 and numeric indicia $24_n$ are indicated to show the relationship of a given indicia to any given cog 23. Aperture 13 provides an anchor for the stop pin 17 as was described in connection with FIG. 1.

In FIG. 6 is shown a more detailed top view of the counter ring 22. The ring 22 is provided with ten cogs 23 which are equally spaced around the inner periphery of the ring. Index teeth $24_a$ and $24_b$ are provided to snap into and out of the index notches 12 of the cam unit 10 (as was described in connection with FIG. 5).

However, in order to maintain the proper central orientation of the counter ring 22 as it is snapped from index notch to index notch around the cam unit 10, there are provided two concentricity extrusions $22_c$ and $22'_c$, as shown in FIG. 6, and which are placed 180° apart and which serve the purpose of maintaining the counter ring around its center point while the index teeth $24_a$ and $24_b$ are moving from one index notch to the next. Again, index numeric indicia $24_n$ are shown digramatically with respect to their associated cogs 23 of the counter ring 22.

Figure 7:
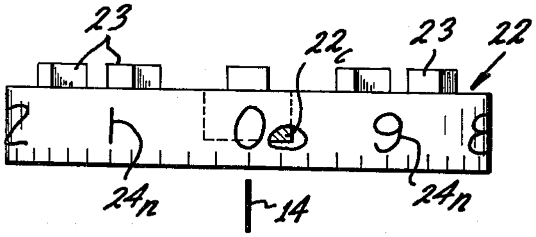
FIG. 7 is a side view of the periphery of the base of the counter ring showing the numerical indicia and index mark in relationship to the cogs of the counter ring.

In FIG. 7 there is seen a side view in elevation of the counter ring 22 from the viewpoint of the left side of FIG. 6 facing the index numeral "0". Referring to FIG. 7 there is seen the counter ring 22 having its numerical indicia $24_n$ (and also linear index marks between the numeric indicia). The associated cogs 23 are shown in their relationship to the index numbers.

The dashed line $22_c$ indicates the concentricity extrusion which corresponds to the extrusion in FIG. 6 opposite the numerical indicator "0". Below the numeric "0" lies the reference index-line mark 14 (which rests on cam unit 10 as seen in FIG. 1).

OPERATION

Referring to FIGS. 1 and 2, the index mark 14 would normally be set or arranged to reside opposite the "0" numeral (as also may be seen in FIGS. 5 and 7).

By the manual turning of the knob 31, in the counterclockwise direction (looking downward at the top of the knob 31), the knob recesses $33_a$ and $33_b$ (which hold lugs $26_a$ and $26_b$) will cause the turning of the key-counter drive 25. The drive keys $29_a$ and $29_b$ when riding on the high lobes $11_u$ and $11'_u$ will reside above the level of the cogs 23 and will have no contact with such cogs until such time as the turning of the key-counter drive 25 brings the drive keys $29_a$ and $29_b$ over and down into the recesses $11_r$ and $11'_r$ of the upper cam surface 11.

At this time, when the drive keys $29_a$ and $29_b$ descend into the recesses $11_r$ and $11'_r$, the drive keys $29_a$ and $29_b$ will now be on the lower level and make sidewise contact with the cogs 23 of counter ring 22.

As the drive keys continue to be rotated in the recesses $11_r$ and $11'_r$, they will contact the two cogs 23 adjacent the recesses and cause the counter ring 22 to rotatably move the distance of the space between two adjacent index notches 12. This occurs when the inner index teeth $24_a$ and $24_b$ are moved from whichever index notch 12 they had been presently residing in and to the next adjacent notch 12 in the counterclockwise position.

Since there are ten equally spaced intervals, or notches 12, this then means that the index numeral "1" will now be residing over the index mark 14; this also means that the shaft 15 has now been turned 1/10 of a complete revolution. If the knob 31 is turned through the notches 12 until the index numerals have moved from "0" through "9" and back to "0", this means that one complete revolution of the shaft 15 has been made in terms of 1/10 of a revolution gradients.

The turning of the knob 31 in the counterclockwise direction from 0 through 9, etc., will cause the motion of the wedge carriage 18 to operate in the downward direction, which of course will move the wedge 19 also in the downward direction. Similarly, by the turning of the knob 31 in the clockwise direction, the wedge carriage 18 and the wedge 19 will then be moved upward in the rising direction.

Whether the knob 31 is moved in the clockwise direction or in the counterclockwise direction, the action of the drive keys $29_a$ and $29_b$ is the same in that each time the drive keys fall into the cam recesses $11_r$ and $11'_r$ these keys engage in contact with the cogs 23 to move them in whichever direction the knob is being turned; that is to say, either counterclockwise or clockwise, with the end result being that the inner index teeth $24_a$ and $24_b$ of counter ring 22 will be moved from notch 12 to the next adjacent notch 12 depending on the direction that is occurring. Thus, there is provided gradients of motion of the turning of shaft 15 in increments of 1/10 of a revolution, or 36° rotation.

Basically, this mechanism has to do with the position 10 and regulation and control of the turning of the shaft 15. The addition of a wedge carrier 18 and wedge 19 is merely illustrative of how usage may be made of the precision turning of the shaft 15, in that the wedge 19 may be positioned up and down in order to, for example, adjust the gap between two movable edges.

As an example of one particular embodiment working in conjunction with shaft 15, the shaft 15 is made of a 10–32 screw thread area which is to say that there are 32 threads per inch.

In the cam unit 10, the difference between the top of the high-lobe $11_u$ and the recess $11_r$ is in the amount of 0.045 inch.

With respect to the relative sizes of the index teeth $24_a$ and $24_b$ (FIG. 6) in relationship to the concentricity extrustions $22_c$ and $22'_c$, the vertical height of $24_a$ and $24_b$ is in the amount of 0.0125 inch more than the vertical height (along the radius) of the concentricity extrusions $22_c$ and $22'_c$.

Thus, by turning the knob 31 to the extent of one full revolution, this will result in the carriage 18 being moved vertically in the amount of 0.031 inch. If the knob 31 is only moved 180° (half turn) then the carriage 18 is moved vertically (either up or down) in the amount of 0.015 inch.

In the operation of the knob 31, the turning of the knob in the amount of a one-half revolution (180°) will cause the index numerals $24_n$ to advance from one numeral to the next along the index mark 14. For example, if the knob 31 is turned counterclockwise (see FIG. 7) in the amount of 180°, then the index numeral 1 will be shifted over, above and opposite the index mark 14, where previously the 0 numeral index was opposite the index mark 14.

Further, for example, referring to wedge 19 of FIG. 1, if the wedge is provided with a 9° angle of increase along its length, then a full revolution turn on the knob 31 will vertically move the carriage 18 in the amount of 0.031 inch (as previously described) and this will result in a horizontal change in wedge thickness of the amount of 0.005 inch.

Likewise, if the knob 31 is only turned one-half of the turn (180°), then the vertical motion of carriage 18 is moved in the amount of 0.015 inch and the wedge thickness is increased or decreased in the amount of 0.025 inch.

These figures, however, pertain to only one particular physical embodiment and variations may be made in the size of the shaft and number of threads per inch and also in the shape and form of the wedge.

Thus, for example, instead of two high-rise lobes and two recesses, there could be four recesses and four high-rise lobes, in which case for every 180° turning of the knob 31, there would be a precision shaft turning of 2/10 of a revolution.

Further, other variations are possible in that there may be a greater or lesser number of cogs 23 on the counter ring 22, which in effect would program the regulation of the amount of shaft turning for each interval movement. Of course, the cylindrical extension of the cam with its index 12 would be adjusted accordingly to match the intervals between the cogs 23.

Other variations involving the relative size of the knob, the counter ring and the cam unit could be organized in a variety of sizes handle different sized shafts.

Thus, a series of inexpensive plastic parts, configured according to the above description, can be assembled onto a shaft control mechanism in order to provide precision regulation and control of the turning of the associated shaft.

What is claimed is:

1. In a precision control mechanism for regulating the turning of a shaft, the combination comprising:

a. means on said shaft and operable to turn said shaft;

b. cam means concentric with said shaft and operatively connected to said first means, said cam means having control surfaces with lobes and recesses;

c. means to meter the amount of turning of said shaft, said metering means being driven by said means to turn said shaft.

2. The mechanism of claim 1 wherein said metering means includes an annular ring rotatable about said cam means, and a key-drive unit which rides on the control surfaces.

3. The mechanism of claim 2 wherein said annular ring includes raised cogs which are connected and disconnected to said key-drive unit according to the configuration of said control surfaces of said cam means.

4. A shaft turning control mechanism comprising:

a. means for turning said shaft;

b. a cam unit concentric with said shaft, said cam unit including a base disc having a cylindrical extension, the top of which extension provides a control surface having lobes and recesses, said cylindrical extension also having a plurality of equally spaced notches around the periphery thereof;

c. a counter ring rotatable around said cylindrical extension, said counter ring having upper cogs equally spaced therearound and also a plurality of inner index teeth for engagement and disengagement with said notches of said cylindrical extension;

d. a key-counter drive having keys which ride upon the lobes and recesses of said control surface and which engage with and disengage from the cogs of said counter ring, said key-counter drive including a plurality of lugs which are driven by said means for turning said shaft.

5. In a position control mechanism for regulating and measuring the amount of turning of a shaft, the combination comprising:

a. a shaft having a threaded portion and a smooth portion;

b. means for rotating said shaft;

c. means for measuring the rotation of said shaft in stepped increments.

6. The mechanism of claim 5 wherein said means for measuring said increments of rotation of said shaft include:

a cam unit having a cam surface;

a drive key following said cam surface;

a plurality of notches equally spaced around the periphery of said cam unit;

a ring concentric with said cam unit, and capable of rotation around said cam unit in measured steps;

anchoring means for anchoring said cam unit in relationship to a starting position of said shaft.

7. The mechanism of claim 6 wherein said cam surface is made of lobes and recesses, and said drive key and said cam surface cooperate so that said drive keys engage and disengage said counter ring in order to drive said counter ring a fixed increment for each recess passed by said drive keys on said cam surface.

8. In a precisional shaft turning and indexing mechanism, the combination comprising:

a. a shaft means for turning said shaft, said means connected to one end of said shaft;

c. a cam unit concentric with said shaft, said cam unit having peripheral notches to provide *n* intervals, and said cam unit having a cam surface with *r* recesses and *l* lobes.

d. a counter ring having n raised cogs and a plurality of inner teeth for engagement with said notches located between said intervals of said cam unit;

e. a drive key unit connected to said means for turning said shaft, said drive key unit having keys which ride upon the cam surface of said cam unit so as to engage with and disengage from the cogs of said counter ring causing the said counter ring to revolve the distance of one interval for each passage of said drive key through one of said *r* recesses.

9. The mechanism of claim 8 including:

a. indicia, arranged on the periphery of said counter ring;

b. a base reference index mark line on said cam unit;

c. means to hold still the said cam unit.

10. The mechanism of claim 9 wherein said means for turning is connected to drive said set of drive keys so said drive keys will ride on the cam surface of said cam unit so as to engage with and disengage from individual pairs of said n raised cogs with the result of causing said indicia on said counter ring to indicate the amount of rotational turning caused to said shaft.

* * * * *